United States Patent [19]

Lordo

[11] 4,453,097
[45] Jun. 5, 1984

[54] PERMANENT MAGNET DC MOTOR WITH MAGNETS RECESSED INTO MOTOR FRAME

[75] Inventor: Robert E. Lordo, Fort Mill, S.C.

[73] Assignee: Powertron Division of Contraves Goerz Corp., Charlotte, N.C.

[21] Appl. No.: 413,935

[22] Filed: Sep. 1, 1982

[51] Int. Cl.³ .......................................... H02K 21/26
[52] U.S. Cl. ..................................... 310/154; 310/218
[58] Field of Search ................. 310/154, 216, 218, 42, 310/40, 46

[56] References Cited

U.S. PATENT DOCUMENTS

| | | | |
|---|---|---|---|
| 2,105,719 | 1/1938 | Collins | 310/154 X |
| 2,278,489 | 4/1942 | Rawlings | 310/154 |
| 2,513,226 | 6/1980 | Wylie | 310/154 |
| 2,850,653 | 9/1958 | Naul | 310/154 X |
| 3,201,661 | 8/1965 | Koutnik | 310/46 X |
| 3,249,780 | 5/1966 | Ibrahim et al. | 310/154 |
| 3,510,707 | 5/1970 | Stone et al. | 310/40 X |
| 3,626,219 | 2/1971 | Lease | 310/42 |
| 3,818,585 | 6/1974 | Preece | 310/42 X |
| 3,906,268 | 9/1975 | de Graffenried | 310/154 |
| 4,104,787 | 8/1978 | Jandeska et al. | 310/154 X |
| 4,412,145 | 10/1983 | Voss et al. | 310/154 |

Primary Examiner—Donovan F. Duggan
Attorney, Agent, or Firm—W. Thad Adams, III

[57] ABSTRACT

A motor frame and stator assembly (20), (27), for a permanent magnet direct current motor is shown which is characterized by accommodating a larger and more powerful armature (12) relative to the interior and exterior dimensions of the frame (20). The assembly (20), (27) includes a metal frame (20) having a pre-determined length and continuous walls the inner surface of which define a void (24). A plurality of arcuate, recessed seats (25) is formed into the inner walls of the frame (20) in spaced-apart intervals around and extending along at least a part of the length of the frame (20). The walls of the frame (20) along the extent of the seats (25) are of reduced cross-sectional thickness. A plurality of permanent magnets (27) having a convex and concave side are mounted by the convex side against one of the plurality of seats (25). A permanent magnet DC motor (10) constructed of one or more metal frame modules (20) is also disclosed.

14 Claims, 8 Drawing Figures

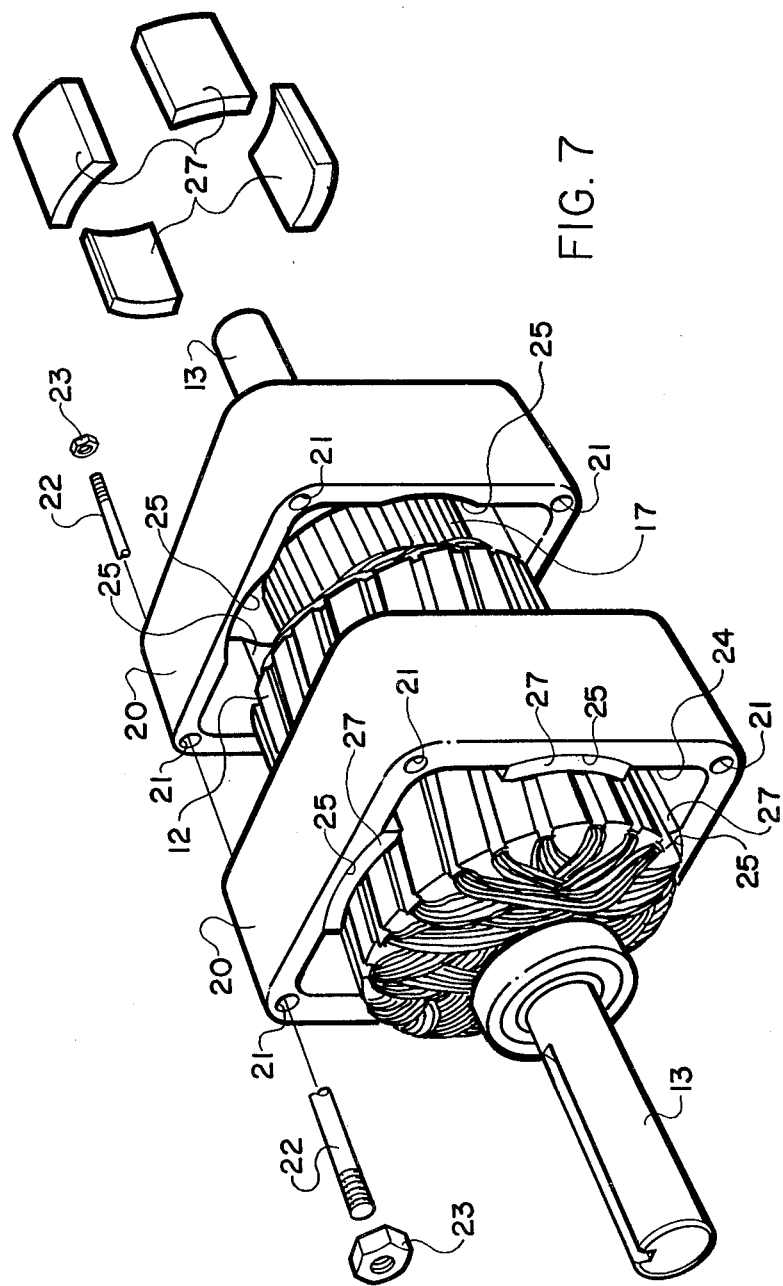

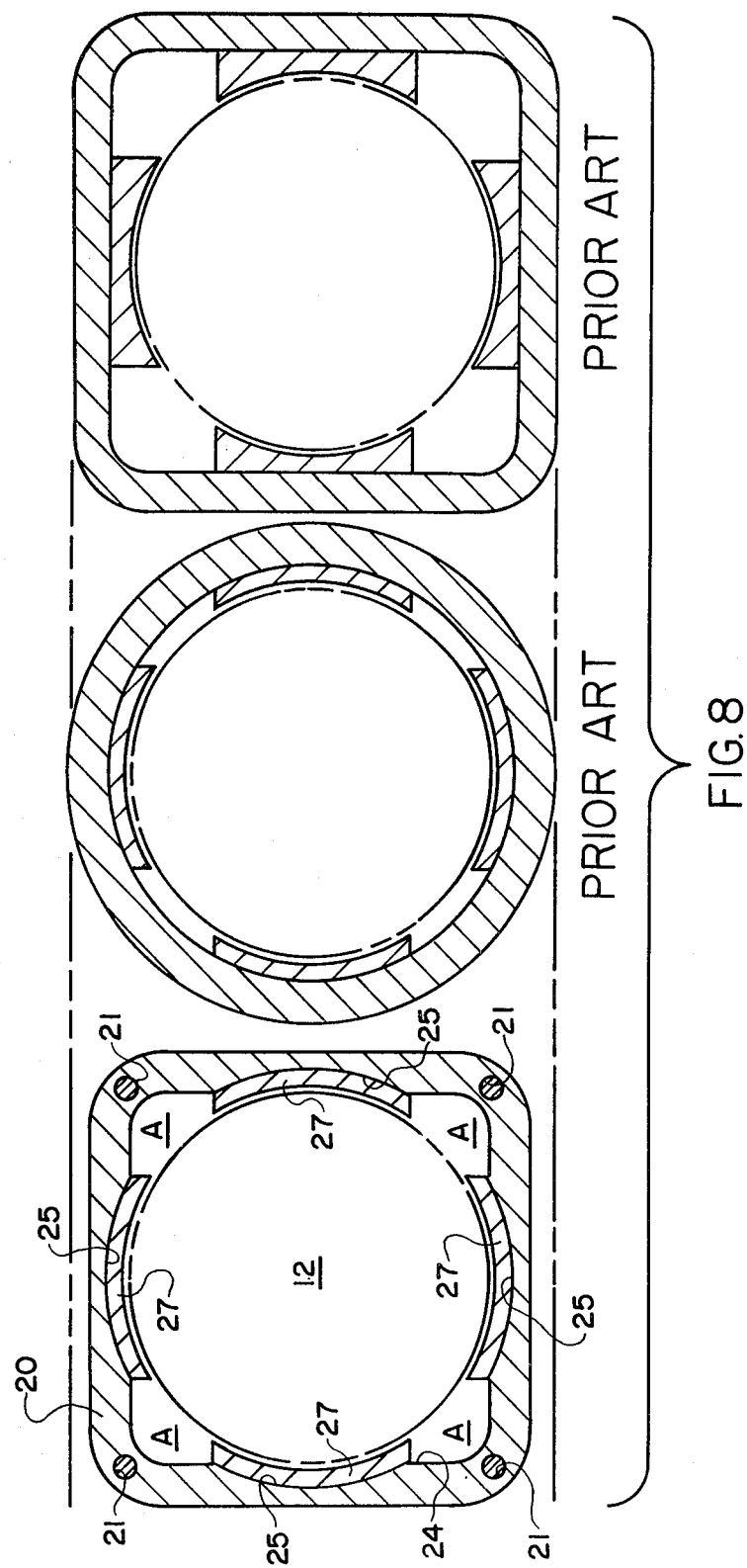

PERMANENT MAGNET DC MOTOR WITH MAGNETS RECESSED INTO MOTOR FRAME

TECHNICAL FIELD AND BACKGROUND OF THE INVENTION

This invention relates to a permanent magnet, direct current machine so constructed that the frame will accomodate a larger and more powerful armature relative to the interior and exterior dimensions of the frame. This description is equally applicable to permanent magnet, direct current motors and generators. For purposes of illustration, the particular disclosure of this application is to motors.

Permanent magnet DC motors have a very wide range of application because of the relatively large amounts of power which can be produced within a relatively small, lightweight structure. This type of motor is constructed within a frame which forms the motor housing. The frame may be circular, square or other cross-sectional shapes depending on the number of poles. Permanent magnets are attached around the interior walls of the frame, leaving sufficient space for the armature to be mounted therein for rotation in close, spaced-apart relation to the magnets. In circular housing motors, the magnets are generally arcuate so that they mate against the inside of the housing. In square frames the magnets are flat on one side and are glued against the planar side walls of the frame, or may be triangular and mounted in the corners of the frame.

The motor armature typically has a plurality of windings which are connected to an external power source through brushes and a mechanical commutator, or through one of many types of brushless commutators. The commutator causes the voltage to be applied selectively to the armature winding so that the magnetic field produced in the armature on the average will be at a 90° angle to the stator magnetic field produced by the permanent magnets. Because the angle between the armature field and the stator field in a DC motor is on the average 90°, torque on the armature is theoretically at its maximum.

Since the stator magnetic field in permanent magnet motors is generated by permanent magnets, no power is used in the field structure. The stator magnetic flux therefore remains essentially constant at all levels of armature current resulting in a linear speed-torque curve over an extended range. For many applications this is a substantial advantage over a comparable wound-field motor. With particular regard to a shunt motor, armature reaction flux tends to follow the low-reluctance path through the pole shoe. Higher current levels cause an angular shift in pole position and a lower effective flux level. Since permanent magnets of the type used in permanent magnet motors have an extremely high coercive force, the magnet material will resist any change in flux whenever the armature reaction field enters. An additional advantage in permanent magnet motors is that since electrical power is not supplied to generate the stator magnetic flux, power requirements are lower since the conversion of electrical power to mechanical power in windings always results in a heat loss in the winding itself. The permanent magnet motor therefore inherently simplifies power supply requirements and, at the same time, requires less cooling. In the invention disclosed herein, these design characteristics of permanent magnet motors are further enhanced.

Because of the ability of DC motors to generate relatively large amounts of torque at operating speed, they are in ever greater demand for applications such as robotics where the motor must create a relatively large amount of torque within a small space.

Heretofore the combined thickness of the permanent magnet and the frame has been a substantial limiting factor in the construction of smaller and more powerful permanent magnet DC motors. Electric motor design is based upon the placement of conductors in a magnetic field. Each turn of a conductor wound into a coil adds to the magnetic field intensity which exists in the space enclosed by the coil. Therefore, the power of a motor depends largely upon how much magnetism, or magnetic flux, there is in the space around the permanent magnet or in the air gap of a motor. Magnetic flux in turn depends on several other factors, including the magnetic flux density, permeability and magnetic field intensity present in the motor. Magnetic flux density is a measure of concentration of magnetic flux in an area. Permeability is the degree to which a medium will support a magnetic field. Relative permeability is used to describe the ability of different materials to support magnetic fields. Air has a relative permeability of one, while ferromagnetic materials such as iron or steel have a relative permeability of several hundred. Most motors are therefore built with iron or steel since a magnetic circuit which contains ferrous materials may have several hundred times the flux of one constructed with non-ferrous materials. Finally, magnetic field intensity describes how magnetomotive force is used around a magnetic circuit.

All of these factors intimately affect the construction of the motor frame. Even if materials of a sufficient strength can be found, the frame cannot be made too thin because the mass of the frame and the magnetic permeability of the frame materials must be sufficient to properly transmit the flux generated by the permanent magnet and by the armature.

The power produced by a motor is proportional to the diameter of the armature, squared, times the length of the armature. A motor can be lengthened while maintaining the same cross-sectional size to increase its power. In many cases, however, the length of the motor cannot be increased because of size limitations. Heretofore the only other practical way of increasing the power of the motor without increasing the length of the armature has been to increase the cross-sectional dimensions of the motor in order to accommodate a larger diameter armature. Again, a more powerful motor is produced but only in a larger size. Therefore, this application relates to the selective decrease in thickness of the motor frame to form recessed seats within which the permanent magnets are placed. Because of the placement of the magnet seats, the transmission and flow of flux through the motor at various points is altered, resulting in greater motor efficiency.

SUMMARY OF THE INVENTION

Therefore, it is an object of the invention to provide a motor frame and stator assembly for a permanent magnet direct current motor characterized by accommodating a larger and more powerful armature relative to the interior and exterior dimensions of the frame.

It is another object of the present invention to provide a permanent magnet direct current motor having a construction which varies the flux flow from the armature to portions of the motor frame, resulting in greater net air gap flux.

It is yet another object of the present invention to provide a permanent magnet direct current motor having much higher heat dissipation characteristics.

These and other objects and advantages of the present invention are achieved in the preferred embodiment described below by providing a metal frame having a pre-determined length and continuous walls, the inner surface of which defines a through void within which to accommodate the rotatably mounted armature. A plurality of arcuate, recessed seats is formed into the inner walls of the frame in spaced-apart intervals around, and extending along at least a part of the length of, the frame. The walls of the frame along the extent of the seats have a reduced cross-sectional thickness. Since the seats are arcuate in shape, they define segments of a circle. A permanent magnet is positioned in each recessed seat. The magnet has a convex side for being adhered against one of the seats and an opposite concave side facing into the void. The concave surfaces collectively define segments of a circle of the proper size to accommodate an armature. According to the preferred embodiment disclosed below, the inner walls of the frame define a square with one of the magnet seats being recessed into each of the four planar sides of the frame. Preferably, the corners on the inside and outside of the frame are rounded.

Also, the thickness of the walls of the frame at the apex of each seat is approximately one half the thickness of the walls between each seat.

According to the embodiment of the invention disclosed below, the ratio of maximum armature diameter to the outside length of one side of the frame is approximately 0.81 to one.

BRIEF DESCRIPTION OF THE DRAWINGS

Some of the objects of the invention have been set forth above. Other objects and advantages of the invention will appear as the description of the invention proceeds, when taken in conjuction with the following drawings, in which:

FIG. 7 is a fragmentary, partially exploded view of a motor according to the present invention; and, FIG. 8 is a cross-sectional view of three motor frames each containing the same size armature, with the motor frame according to the present invention shown on the left in comparison with conventional circular (center) and square (right) motor frames.

DESCRIPTION OF THE PREFERRED EMBODIMENT

Figure 1:
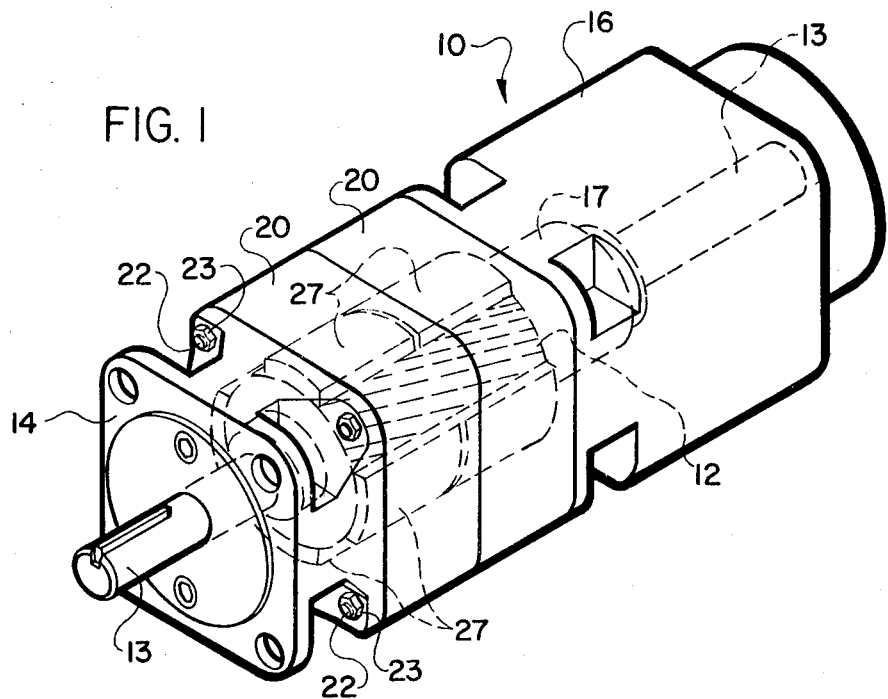
FIG. 1 is a square frame, permanent magnet DC motor in accordance with the present invention.

Referring now specifically to the drawings, a permanent magnet DC motor according to the present invention is generally shown at broad reference numeral 10 of FIG. 1. The motor generally comprises a slotted core armature 12 of conventional design mounted for rotation on a shaft 13. Armature 12 is enclosed on one end by an end cap 14 and on the other end by an accessory housing 16 for enclosing a commutator 17 as well as other components not shown. Mounted between cap 14 and accessory housing 16 in FIG. 1 are two metal motor frame modules 20. Accessory housing 16, cap 14 and the two motor frame modules 20 are all tied together by means of magnetically permeable bolts 22 which extend through suitably positioned, matingly aligned holes 21 and secured by nuts 23. While the particular motor illustrated in FIG. 1 shows two motor frame modules 20, a motor according to the present invention can be constructed with a single module 20, with two or more such modules or with a single metal frame with multiple magnet segments, depending upon the length of the armature and other considerations.

Figure 3:
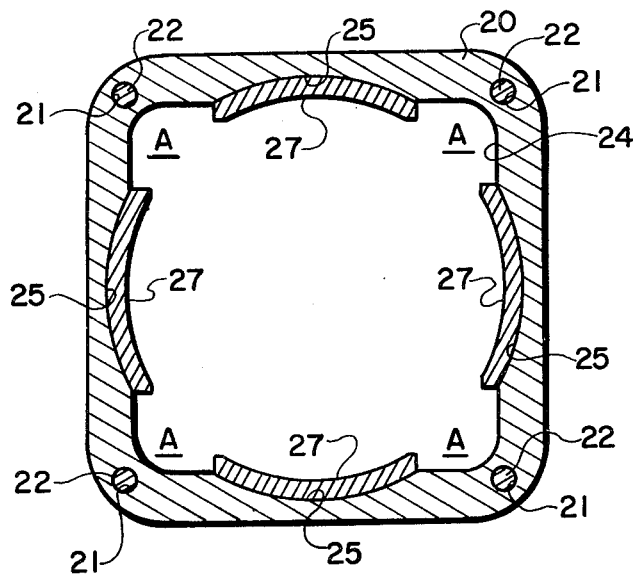
FIG. 3 is a cross-section of the motor in FIG. 1, with the armature omitted.

FIG. 3 shows one of the frame modules 20 in cross-section. Frame module 20 is substantially square with rounded interior and exterior corners and defines a void 24 therein. A recessed seat 25 is formed by any suitable process into each of the four planar interior sides of frame module 20. Each seat 25 has an arcuate shape and is regular one to the other — that is, the walls of the frame module 20 defining the seats 25 collectively define a circle. The thickness of the walls of frame module 20 at the apex, or center, of each seat 25 is approximately one half the thickness of the walls between each seat 25. An arcuate permanent magnet 27 is positioned in each seat 25 and secured by an adhesive, such as Rexite P2SB. The magnets may be "alnico", ceramic or samarium cobalt type. The structure is also illustrated in an exploded view in FIG. 7. The magnets 27 and the frame module(s) 20 collectively comprise the stator assembly of the motor.

Figure 5:
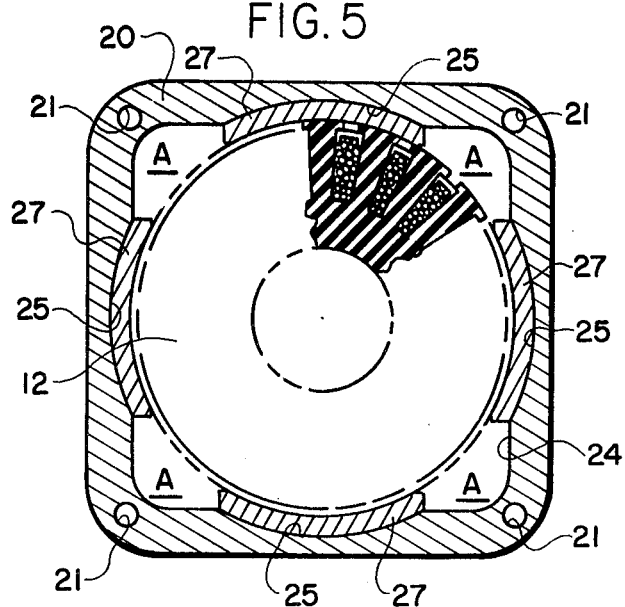
FIG. 5 is a cross-section of the motor in FIG. 1, with only a portion of the armature shown in cross-section for illustration.

FIG. 5 is another cross-sectional view of a frame module 20 with armature 12 positioned therein. As is shown in FIG. 5, the four interior corners A of the frame module 20 define relatively large air spaces. This configuration provides a greater effective distance between armature 12 and frame module 20. As a result, the effect of the armature flux on frame module 20 and the permanent magnet flux is decreased since flux interaction is inversely proportional to distance. In addition, the arrangement shown in FIG. 5 results in greater cooling efficiency because of the larger volume of area between the magnets 27, and between armature 12 and frame module 20.

Figure 6:
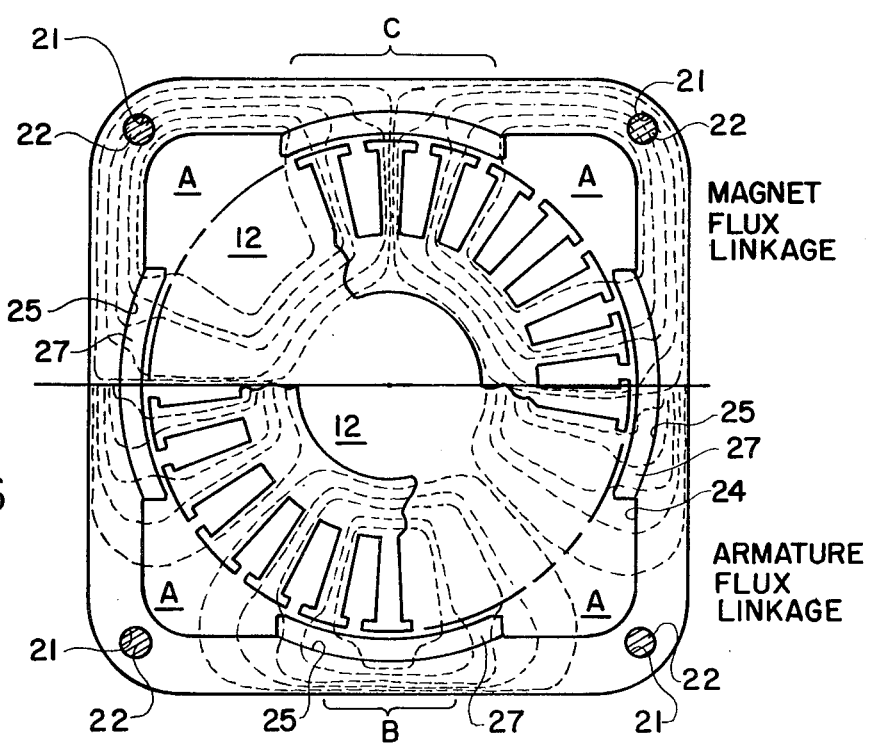
FIG. 6 is a cross-sectional view of a square motor frame housing and armature according to the present invention, with lines representing magnet flux linkages and armature flux linkages thereon.

An even more significant effect is achieved because of the thinner walls behind each of the magnets 27. As mentioned above, the wall thickness at the apex of each of the seats 25 is approximately one half the thickness of the walls elsewhere on the frame module 20. The diminished wall thickness has an effect on the flux flow during operation of the motor. FIG. 6 illustrates the magnet flux linkage (top half) and armature flux linkage (lower half) of the motor 10 constructed according to this invention. The bracketed area "B" illustrates that the flux density through the thinner walls behind the recess is much higher than any other areas of the frame.

This "pinching" of the armature flux results in magnetic saturation in the thin frame walls behind seats 25. Therefore, armature flux is minimized. Since magnet flux is unaffected, the result is a net air gap flux, which results in a greater voltage output in a generator or high torque in a motor. Also, since the flux is minimized, sparking during coummutation is reduced substantially.

Again, referring to FIG. 6, a bracketed area "C" is shown coincident with one of the seats 25 with reference to magnet flux linkages. The magnet flux linkages converge at right angles to the magnet 27 and the adjacent walls of the frame module 20. The flux linkages are symetrical and diverge at the point of the least wall thickness at the apex of seat 25. At this divergence a "null" results, indicating an absence of magnet flux flow in this domain. Since no magnet flux flow is present at this point, there is no adverse affect on the magnet flux flow.

As is apparent from the illustration in FIG. 3, recessing the magnets 27 into the seats 25 leaves a larger space within the housing module 20 which can accommodate armature 12. Therefore, a frame module 20 having outside dimensions identical to that of a conventional permanent magnet DC motor can accommodate a larger armature 12. For example, the maximum practical armature diameter which can be achieved on a conventional 4 inch square motor frame is 3 inches. With a motor frame according to the present invention, an armature 3¼ inches in diameter can be accommodated. In addition to the greater cooling capacity and other advantages obtained in this construction, a more powerful motor can be produced having the same dimensions as one with less power. The armature 12 itself tends to run cooler since it has a larger surface area and therefore dissipates heat more rapidly. Or, a motor having the same power output as a conventional motor can be manufactured with smaller dimensions.

This is illustrated in FIG. 8 where a frame module 20 and armature 12 (left) is shown in comparison with circular (center) and rectangular (right) prior art examples of permanent magnet motor construction. In all three cross sections, the armature is exactly the same size and, with all other factors being equal, will generate substantially the same power. As is evident, the frame module 20 makes a more compact motor possible. This factor is becoming more and more improtant as DC motors with speed feedback controls are adapted for use in industrial robots and other applications where weight and size are limiting factors.

Figure 2:
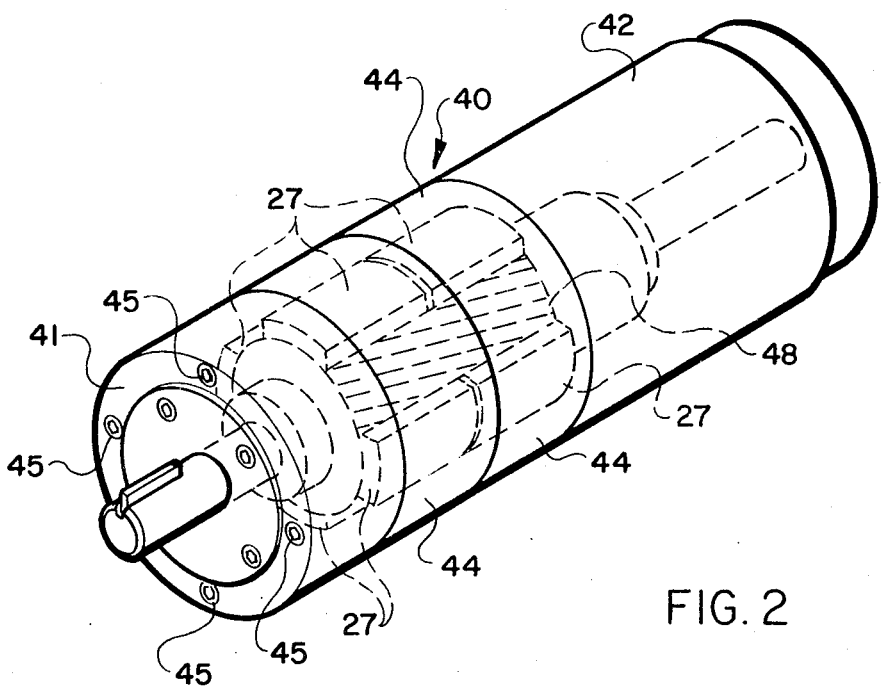
FIG. 2 is a perspective view of a circular frame, permanent magnet DC motor according to the present invention.

The same concept as described is also illustrated with reference to circular frame motors. FIG. 2 illustrates a circular frame motor broadly at reference numeral 40, comprised of an end cap 41 on one end and accessory housing 42 on the other end. Two circular frame modules 44 are positioned in concentric alignment with cap 41 and accessory housing 42 and connected together by bolts 45 extending through matingly aligned bolt holes 46 (FIG. 4) in their side walls. A slotted core armature 48 is mounted for rotation within a central void 47 defined by the inner walls of frame modules 44. As with the square motor 10 shown in FIG. 1, the illustration of two frame modules 44 in FIG. 2 is arbitrary. One or more frame modules 44 of any desired length can be used according to the particular application desired.

Figure 4:
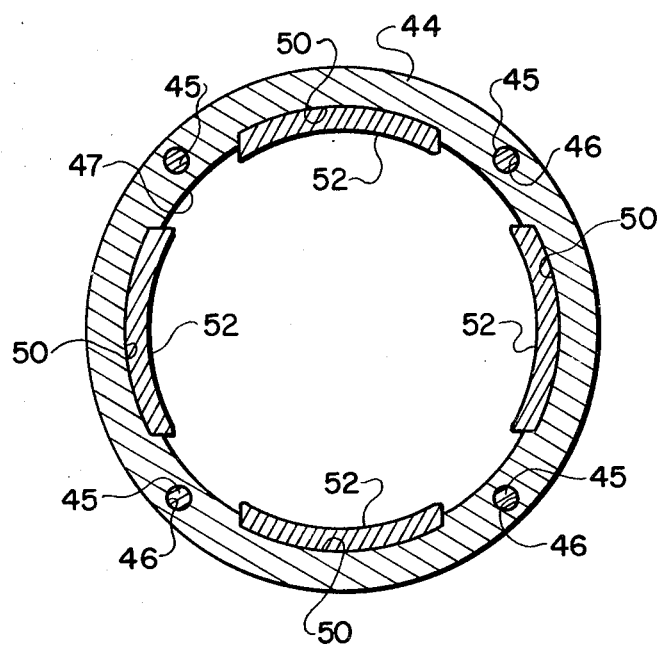
FIG. 4 is a cross-section of the motor in FIG. 2, with the armature omitted.

In FIG. 4, one of the frame modules 44 is shown in cross-section. Recessed seats 50 are formed in the inner walls of frame module 44, one in each quadrant. As with the seats 25 in frame module 20, each seat 50 is mutually perpendicular to each adjacent seat 50. The seats 50 are formed so that an extended imaginary line normal to the opposing side walls of each seat 50 defines a tangent, rather than a radius, to frame module 44.

An arcuate permanent magnet 52 is mated with and adhered to each recess 50 and collectively comprise the stator assembly of the motor. As with the square frame module 20, frame module 44 permits a larger armature 48 to be positioned within a motor having the exact same outside dimensions as a conventional circular motor housing. However, because of the symetrical nature of circular frame module 44, the advantages achieved in terms of reduced armature flux in frame module 40 and greater cooling capacity is not achieved to nearly the same degree.

A permanent magnet direct current machine characterized by accommodating a larger and more powerful armature relative to the interior and exterior dimensions of the frame is described above. Various details of the invention may be changed without departing from its scope. Furthermore, the foregoing description of a preferred embodiment of the motor according to the present invention is provided for the purpose of illustration only and not for the purpose of limitation — the invention being defined by the claims.

I claimed:

1. A motor frame and stator assembly for a permanent magnet direct current machine characterized by accommodating a larger and more powerful armature relative to the interior and exterior dimensions of the frame, said assembly comprising:
    (a) a metal frame having a pre-determined length and continuous walls the inner surface of which define a through void within which to accommodate a rotatably mounted armature;
    (b) a plurality of arcuate, recessed seats formed into the inner walls of the frame in spaced-apart intervals around and extending along at least a part of the length of the frame, the walls of said frame along the extent of said seats being of reduced cross-sectional thickness and having a smooth, arcuate, even taper from a relatively thick wall at opposite edges of each seat to a relatively thin wall at the apex of each seat equidistant from the opposite edges thereof for compressing the armature flux within the tapered walls behind each seat to achieve magnetic saturation therein; and,
    (c) a plurality of permanent magnets, each magnet having a convex side for being matingly adhered against one of said plurality of seats, and an opposite, concave side facing into the void.

2. An assembly according to claim 1 wherein the inner walls of said frame define a circle.

3. An assembly according to claim 1 wherein the inner walls of said frame define a square, one of the plurality of seats is recessed into each of the four planar sides of the frame and a relatively larger air gap is provided between adjacent magnets than is provided between all of the magnets and the armature.

4. An assembly according to claim 3 wherein said frame is substantially square in cross-section and wherein the corners on the inside and outside of said frame are rounded.

5. An assembly according to claim 4 wherein the length of each side of the frame is 4 inches and the frame will accommodate an armature 3¼ inches in diameter.

6. An assembly according to claim 1 wherein the thickness of the walls of the frame at the apex of each seat is approximately one half the thickness of the walls between each seat.

7. An assembly according to claim 1 wherein the magnets are samarium cobalt.

8. A permanent magnet direct current machine characterized by accommodating a larger and more powerful armature relative to the interior an exterior dimensions of the machine frame, said machine comprising:
   (a) a metal frame having a pre-determined length and continous walls the inner surface of which define a through void;
   (b) a plurality of arcuate, recessed seats formed into the inner walls of the frame in spaced-apart intervals around and extending along at least a part of the length of the frame, the walls of said frame along the extend of said seats being of reduced cross-sectional thickness and having a smooth, arcuate, even taper from a relatively thick wall at opposite edges of each seat to a relatively thin wall at the apex of each seat equidistant from the opposite edges thereof for compressing the armature flux within the tapered walls behind each seat to achieve magnetic saturation therein; and,
   (c) a plurality of permanent magnets, each magnet having a convex side for being matingly adhered against one of said plurality of seats, and an opposite, concave side facing into the void; and
   (d) an armature positioned for rotation within the void in close, spaced-apart relation to said magnets.

9. A permanent magnet direct current machine according to claim 8 wherein the inner walls of said frame define a square and wherein one of the seats is recessed into each of the four planar sides of the frame and a relatively larger air gap is provided between adjacent magnets than is provided between all of the magnets and the armature.

10. A permanent magnet direct current machine according to claim 9 wherein said frame is substantially square in cross-section and wherein the corners on the inside and outside of said frame are rounded.

11. A permanent magnet direct current machine according to claim 9 wherein the length of each side of the frame is 4 inches and the frame will accommodate an armature 3¼ inches in diameter.

12. A permanent magnet direct current machine according to claim 8 wherein the thickness of the walls of the frame at the apex of each seat is approximately half the thickness of the walls between each seat.

13. A permanent magnet direct current machine according to claim 8 wherein the magnets are samarium cobalt.

14. A permanent magnet direct current machine according to claim 8 wherein the frame is circular in cross-section.

* * * * *